Patented Dec. 28, 1948

2,457,108

UNITED STATES PATENT OFFICE 2,457,108

ADHESIVE AND METHOD OF MAKING

Chester L. Baker, Narberth, and Robert H. Sams, Upper Darby, Pa., assignors to Philadelphia Quartz Company, Philadelphia, Pa., a corporation of Pennsylvania No Drawing. Application July 24, 1943, Serial No. 496,088

16 Claims. (Cl. 106—79)

This invention relates to manufacture of adhesives; and it comprises a dry-mix adhesive suitable for use, when mixed with water, in the production of water-resistant laminated products, such as combined and corrugated paper board, for example; said adhesive comprising a vegetable protein in amount ranging from about 50 to 2 per cent by weight, water ranging from about 5 to 47.5 per cent by weight, an alkali metal silicate having a ratio of alkali metal oxide to $SiO_2$ ranging from about 1:1.5 to 1:4 in amount ranging from about 1 to 80 per cent by weight on the anhydrous basis, the larger percentages of silicate being employed with the smaller percentages of protein within the ranges stated, and usually a small amount of a preservative; the alkali metal silicate in said adhesive being of a composition such that, when mixed with 3 times its weight of water at room temperatures, it dissolves substantially completely within 30 minutes; said adhesive being a freely-flowing and non-caking dry mix and, when mixed with water in the proportions of about 1 part dry-mix to 1 to 24 parts of water, forming an adhesive having a working life which is longer than that of an adhesive of similar composition formed directly from an alkali metal silicate solution. The invention also includes a method of compounding said adhesive which comprises mixing a sodium silicate solution, having a ratio of $Na_2O$ to $SiO_2$ ranging from about 1:1.5 to 1:4, and containing from about 35 to 85 per cent water, with a sufficient quantity of a vegetable seed flour to make a crumbly mixture, containing from about 50 to 2 per cent protein, a small amount of a preservative being usually mixed in, then removing any excess water above a content of about 47.5 per cent to form a freely-flowing mixture, taking care not to dry the mixture to such an extent that the sodium silicate contained therein will not dissolve substantially completely within a period of 30 minutes when mixed with 3 times its weight of water at room temperature. The invention also includes a method of preparing some of the adhesives described by first preparing a mass of sodium silicate in a state approximately between that of a gel and that of a solid, the water content being such that the mass has sufficient rigidity to be ground but tends to set up or coalesce after grinding, then grinding and mixing this silicate with a sufficient quantity of a water-absorbing solid, such as clay and/or a vegetable seed flour to prevent coalescence of the silicate and to form a non-caking mixture, the protein content of the final mix amounting to about 2 to 50 per cent by weight; all as more fully hereinafter set forth and as claimed.

In our copending application, Serial Number 474,486, filed February 2, 1943, and now abandoned, we have described certain silicate-protein adhesives which were made advantageously by dispersing a proteinaceous vegetable seed flour in water and mixing in a sodium silicate solution in suitable proportions. These adhesives have been found capable of producing water resistant bonds and to set with sufficient speed to be used in the machine fabrication of laminated paper board. One disadvantage of these adhesives has been their relatively short working life. The adhesives capable of producing bonds having the highest water resistance, for example, have a working life of only about 15 minutes to 8 hours. We have now found a simple method of increasing this working life, without substantially affecting the strength of the adhesive bond produced, the adhesives produced by this new method affording several other advantages over the adhesives produced by the methods described in the acknowledged prior application.

We have found that, if the silicate of a silicate-protein adhesive is brought to at least a plastic or semi-solid state, and aged for a short time while in this state prior to reacting it completely with the protein material, this is, before the preparation of the final adhesive, the resulting adhesive formed upon the addition of water has a working life which is often several times as long as that which would be obtained in the case of an adhesive produced by the wet mixing methods described in our prior application. The cause for this phenomenon is not clearly understood but a possible explanation is that the silica content of the adhesive is altered in some fashion and becomes more slowly reactive when in the semi-solid stage and that it then takes some time to reach a more reactive state after it goes into solution, that is, when the final adhesive is prepared. Support is given to this theory by several phenomena.

We have found that, if a silicate solution is quickly brought to the semi-solid state, mixed with a protein and then promptly dispersed in water to form an adhesive, the working life of the resulting adhesive is shorter than that of a similar adhesive prepared in exactly the same manner except for a delay of a few hours (aging) before the dispersing step. This indicates that the silicate must remain in the semi-solid state for some time to acquire the desired slow reactivity. We have also discovered that the strength of the bond produced by the new adhesive increases towards the end of its working life, i. e. when the silicate has fully recovered its reactivity. Another unexpected discovery is that, if no aging of the silicate is provided while in the semi-solid state, the bond produced by the final adhesive is not as good. The aged dry mix produces a bond which is comparable to that of a wet mix adhesive of the same composition, while a dry mix which has not been aged produces a bond which is inferior to that produced by a similar wet mix. An aging period, while the silicate is in a semi-solid state, is therefore required to produce best results. This aging period should be at least about 4 hours. Whatever the cause for these phenomena, the facts remain as stated.

There are, of course, various ways in which our discoveries may be used in practice. The silicate of soda can be brought to the plastic or semi-solid stage either before or after being mixed with the protein. Since the silicate, when in the most desirable state of hydration to produce optimum results, is not sufficiently stable to form a non-caking product in the absence of a filling material, it is most convenient to employ the protein material as a stabilizing filler, which is another way of stating that a dry-mix silicate-protein product is employed. But it is equally possible to employ an inert pulverulent material, such as clay, to prevent the silicate from caking and to mix in the protein only at the time it is desired to make up the final adhesive solution.

The addition to our adhesives of clay permits making up the final adhesive with somewhat more water than could be employed in the absence of the clay. The clay then provides sufficient additional body or increases the viscosity sufficiently to enable the adhesive to be utilized in spite of the additional water present. The clay should not be added in substantial excess of the protein flour if bonds of comparable strength are desired.

There are obvious advantages, of course in employing a dry-mix adhesive in which all components are present. This simplifies the handling and packaging problems and, when the final adhesive is made up, it is only necessary to add one material to the water. There is less chance for mistakes to be made. And only 20 per cent by weight of the final adhesive requires transportation.

While several dry-mix silicate-protein adhesives have been mentioned in the prior art, none of these adhesives appears to have come into practical use. The cause for this appears to reside in the fact that none of the solid silicate of soda compositions which have been sold commercially are capable of producing optimum results when combined in dry form with vegetable protein. We have found, for example, that the usual commercial powdered anhydrous silicate of soda glasses are too slowly soluble in water to be used satisfactorily, while the powdered crystalline hydrous and anhydrous silicates have too high an alkali content to produce best results and the hydrous spray-dried silicates on the market are somewhat too slowly soluble to be entirely satisfactory. The commercial spray-dried hydrous silicate containing about 17.5 per cent water and having a ratio of $Na_2O$ to $SiO_2$ of 1:2, for example, produces a dry-mix product which, while satisfactory for many purposes, does not produce as good results as the products obtained by using more rapidly soluble silicates having higher contents of silicate and water.

In preparing our dry mix adhesives two methods are particularly applicable. In the first of these the protein flour is mixed with a concentrated silicate solution in such proportions that a crumbly mass is formed which can be packaged without caking. This free flowing product can be later mixed with water to form an excellent adhesive. This is a surprising result since it would have been expected that a reaction between the protein and silicate would occur, thereby denaturing the protein. But our results show that, if such a reaction occurs, it is not sufficient to impair the usefulness of the adhesive appreciably. In this procedure any of the commercial water glasses can be employed which contain a ratio of $Na_2O$ to $SiO_2$ within the range of about 1:1.5 to 1:4. The less water contained in these silicate solutions the better, since this reduces the time required for the silicate to reach the semi-solid state. In general it takes from about 0.5 to 2 parts of protein flour to 1 part of the commercial silicate solution to produce the desired crumbly mass. If desired this mass can be dried somewhat, either by air drying or by heating slightly, but the protein flour, if used in correct proportions, absorbs water from the silicate and thus reduces it to the desired semi-solid state, without the necessity of introducing any artificial drying step. It does no harm, of course, to dry the silicate in the dry-mix beyond what we have called the semi-solid stage so long as it does not become too slowly soluble. But if it is dried beyond the point at which it dissolves substantially completely within a period of about 30 minutes when mixed with 3 times its weight of water at ordinary temperatures, inferior results are obtained.

The second method of making our dry mixes is to prepare a silicate mass which can be ground to a powder but which contains so much water that the resulting powder tends to set or coalesce unless mixed with a filler. The protein flour can be mixed directly with a ground mass of this type or, as mentioned previously, the ground mass can be pre-mixed with an inert material to stabilize it. It is relatively easy to prepare a silicate mass of the type described by control of the viscosity. We have found that, when a sodium silicate solution, having a ratio of $Na_2O$ to $SiO_2$ of 1 to 4, is concentrated until its viscosity reaches the value of about 10,000 poises at ordinary temperatures, the resulting product can be ground satisfactorily and used as described. The corresponding viscosity for a silicate solution, having a $Na_2O$ to $SiO_2$ ratio of 1:1.6, is about 600,000 poises at ordinary temperatures. The water content of these two solutions is about 68 per cent and 37 per cent respectively. This represents the maximum content of water for semi-solids which are capable of being ground in the manner stated. Of course it is possible to employ silicates which are solids in the same manner provided that their water content is sufficient to make them quickly soluble. The minimum water content of the silicates having the required rate of solubility varies from about 10 per cent for silicates having a ratio of 1 Na₂O to 1.6 SiO₂, to about 50 per cent for silicates having a ratio of 1 Na₂O to 4 SiO₂.

Various vegetable protein flours containing at least 10 per cent protein can be used in the present invention, such as soybean flour, wheat flour, rye flour, peanut meal, cotton seed meal, castor bean flour, etc. We use the terms "flour" and "meal" interchangeably to include relatively finely ground products, containing more or less of the oil originally present in the seed. The oil present in some of these flours has little effect and hence we prefer for economic reasons to employ commercial flours which are produced by grinding the residues left after removal of the oils. The carbohydrate content of these flours appears to act merely as a filler. Processed flours containing up to 70 per cent or more of vegetable protein can be employed.

It is advantageous to include in our compositions, which contain an oil seed flour, a preservative which has both dispersing and disinfecting properties. The latter is important in order to prevent the compositions from fermenting if accidentally subjected to moisture. Pine oil is one of the best preservatives and this possesses satisfactory dispersing properties. Among other satisfactory materials the following may be mentioned: sodium alkyl aryl sulfonates, such as Nacconal, Activol, Santomerse and Quaker Pro-so-Tex 75; sulfonated higher phenols, such as Orthocen K, Aresklene and Beaconal A; petroleum sulfonates, such as SP-717 and Stablex G; sulfated aryl alcohols, such as Titamine T. C. P., Maprofix and Supersulfate F. S. Powder; sulfolignins, such as Dilex; natural oils, such as pine oil and higher alkyl aryl sulfates, such as Areskap. It will be noted that most of the chemicals in the above list are complex aryl compounds of sulfur-containing acids. Any chemicals of this type which have dispersing and disinfecting properties can be used in our invention.

If desired these preserving agents can be mixed with the protein flour alone to form non-caking mixtures which can be shipped as such to the point at which the adhesive is to be used. When it is desired to make up the final adhesive, these non-caking mixes can then be dispersed in water and the required amount of a silicate which has been dehydrated at least to a semi-solid stage can be mixed in, in order to produce an adhesive having a long working life.

The preserving agents have several important functions in our dry mixes. Aside from serving as dispersing agents, their disinfecting properties are valuable in preventing fermentation and mold formation. Bacterial growth is prevented, which is important since untreated protein flours form excellent media to support bacterial growth. These agents also render the compositions less attractive to vermin and serve as rodent repellants, for example. They have a slight moistening effect which renders the compositions less dusty. And they also reduce segregation of the components of the mixtures. If a coloring agent is employed in the dry mixes, for example, the preservative serves to keep this evenly distributed throughout the mass.

Our dry-mix compositions do not contain caustic soda. This distinguishes them from somewhat similar compositions which have been disclosed in the prior art most of which have contained added alkali which has been previously thought to be an essential ingredient to produce dispersion of the protein. Any added caustic would be detrimental in our adhesives, when used in the combining of paper board, for example, for the reason that it would produce objectionable desizing of the paper.

In making final adhesives from our dry-mix silicate-protein compositions it is merely necessary to disperse the latter in the proper amount of water. In general from about 1 to 24 parts of water are employed to 1 part of the dry-mix. The final adhesive should contain from about 2 to 15 per cent of protein.

The adhesives which are prepared in the manner described above are in general better than either protein adhesives or silicate adhesives. They produce relatively water resistant bonds of greater wet strength than either protein or silicate adhesives. In particular they show good retention of the glue line, that is, the glue lines produced with these adhesives do not dissolve or wash away when soaked in water. Upon subsequent drying, therefore, the strength of the bonds is restored substantially to that of the original bonds, which is a highly important feature.

For maximum resistance to water, wet and dry strength of bond, recovery on drying and lack of desizing action and staining of the paper board, slightly narrower ranges than those stated previously are desirable. These preferred adhesives contain silicates having ratios of Na₂O to SiO₂ ranging from about 1:2.4 to 1:3.9; and the adhesives contain from about 10 to 60 per cent by weight of silicate on the anhydrous basis, from about 8 to 47 per cent of water, and from about 40 to 5 per cent of vegetable protein. In general the larger the proportion of Na₂O to SiO₂ in our adhesives, the larger the proportion of protein required to produce wet bonds of high strength and the lower the proportion of water permissible in our dry-mixes.

The working life of our dry-mix adhesives ranges from about 4 to 24 hours or over. Toward the end of their working life their viscosity increases. This increase in viscosity can be overcome to some extent by the addition of water but if this is continued too long the bonds produced tend to become inferior. The strength of the bands produced increases with the age of the final adhesive at least until the point is reached that the adhesive becomes unworkable owing to its high viscosity.

The following specific examples are illustrative of our adhesive compositions and methods of compounding the same and represent practical operating embodiments of our invention.

Example 1

In making a dry-mix adhesive by using a liquid silicate solution, we introduced into a mixing vessel 65 parts of a soya flour, called SF#100 and distributed by the Central Soya Comany, Inc., of Chicago, Ill. This flour contained about 50–53 per cent of protein. The stirrer was started and 2 parts of a steam-distilled pine oil were thoroughly incorporated. Then 33 parts of a silicate of soda solution were mixed in, having a ratio of Na₂O to SiO₂ of 1 to 2.90 and containing about 11 per cent Na₂O, 31.9 per cent SiO₂ and 57 per cent water. Mixing was continued until a dry-appearing crumbly mass was obtained. It was found that this dry-mix product could be packaged in paper bags and stored without caking. When mixed with water in the proportions of about 1 part dry-mix to 4 parts of water, it forms an adhesive which, after being set by heat, with or without pressure, shows a high retention of the glue line for an immersion period of about 24 hours. The adhesive bond, after soaking in water 24 hours, shows a wet strength which is greater than that obtained with most silicate, protein and starch adhesives. Upon drying, the bond recovers much of its original dry strength. This adhesive has a working life of about 24 hours. The final dry-mix has the following composition:

|  | Per cent |
|---|---|
| Protein | 34.5 |
| Na₂O | 3.6 |
| SiO₂ | 10.5 |
| Pine oil | 2.0 |
| Water | 25.2 |

*Example 2*

In making a dry-mix adhesive using a semi-solid silicate we first mixed 30 parts of a hydrous sodium silicate powder, having a ratio of Na₂O to SiO₂ of 1:3.22 and containing about 19.4 per cent Na₂O, 62.5 per cent SiO₂ and 17.5 per cent water, with 70 parts of a sodium silicate solution having the same ratio but containing about 9.1 per cent of Na₂O, 29.5 per cent SiO₂ and 61.3 per cent of water. This mixture was allowed to come to equilibrium. This mixture formed a semi-solid product which was sufficiently brittle to be ground. After grinding, it was mixed with SF#100 soya flour containing 2 per cent of pine oil in the proportions of 2 parts silicate to 1 part of the flour. The final composition of the resulting dry-mix was as follows:

|  | Per cent |
|---|---|
| Protein | 17.3 |
| Na₂O | 8.2 |
| SiO₂ | 26.4 |
| Pine oil | 0.7 |
| Water | 35.1 |

The above composition was found to be stable, non-caking and capable of being packaged in paper bags. When mixed with water in the proportions of about 1 part adhesive to 1½ parts of water it forms an adhesive which will produce water resistant bonds of high strength. This final adhesive has a working life of about 18 hours.

*Example 3*

In another method of compounding our adhesive we mixed 2 parts of SF#100 soya flour with one part of a spray dried, powdered silicate having a ratio of Na₂O to SiO₂ of 1:2 and containing about 27.5 per cent of Na₂O, 55 per cent of SiO₂ and 17.5 per cent of water. The resulting dry-mix forms an adhesive which is satisfactory for most purposes when mixed with water in the proportions of about 1 part dry mix to 5 parts of water.

*Example 4*

Another method of preparing a semi-solid silicate for use in our process is to take 1 part of the silicate solution used in Example 1 and dehydrate it until it has a viscosity of 100,000 poises. This product is then ground finely and mixed with 2 parts of SF#100, forming a stable non-caking dry-mix adhesive. If the semi-solid product is not mixed with the soya flour after grinding it coalesces or recombines owning to its high water content.

*Example 5*

In this example we prepared a semi-solid silicate by mixing 0.3 part of the hydrous sodium silicate powder used in Example 2 with 1.7 parts of the sodium silicate solution also used in Example 2. After this mixture had come to equilibrium it was found to have a viscosity of about 30,000 poises absolute. This product was granulated and mixed with 1 part of SF#100 to form a stable, dry-mix adhesive.

*Example 6*

In this example we thoroughly mixed 10 parts of SF#100 soya flour with 10 parts of a silicate of soda solution having a ratio of Na₂O to SiO₂ of 1:3.90 and containing 6.3 per cent of Na₂O, 24.6 per cent of SiO₂ and 69 per cent of water. This formed a satisfactory dry-mix adhesive.

*Example 7*

In this example we dry-mixed 2 parts of the spray dried, powdered silicate used in Example 3 with 15 parts of SF#100 soya flour to form a dry-mix adhesive.

*Example 8*

In this example we mixed 28 parts of the silicate of soda solution used in Example 1 with 9.8 parts of SF#100 to form a dry-mix adhesive.

*Example 9*

In this example we dry-mixed 20 parts of the spray dried, powdered silicate used in Example 3 with 10 parts SF#100 to form a dry-mix adhesive.

*Example 10*

In this example we mixed 5 parts of the silicate of soda solution used in Example 6 with 10 parts of SF#100 soya flour to make a dry-mix adhesive.

*Example 11*

In this example we mixed 1 part of Suprex clay with 1 part of a 50-50 mixture of the two silicates used in Example 2. This formed a free-flowing, stable dry mixture which was aged 3 days. To make an adhesive we then mixed the above with 1 part of SF#100 soya flour and 5.6 parts of water. The resulting adhesive produced bonds having satisfactory dry and wet strengths.

*Example 12*

In this example we mixed 1 part of SF#100 soya flour with 1 part of a 50-50 mixture of the two silicates used in Example 2. This formed a free-flowing, stable dry mixture which was aged 3 days. To make an adhesive we mixed the above with 1 part of Suprex clay and 5.6 parts of water. The resulting adhesive gave results substantially identical to those obtained with the adhesive of Example 11.

*Example 13*

In this example we mixed 9 parts of wheat flour (10 per cent vegetable protein) with 1 part of a 50-50 mixture of the two silicates used in Example 2. This formed a free-flowing, stable dry-mix adhesive which was aged 3 days. To form a final adhesive we then mixed the above with 13.2 parts of water. The resulting adhesive formed bonds of satisfactory wet and dry strengths.

*Example 14*

In this example we mixed 1 part of SF#100 soya flour with 2 parts of a silicate solution having a ratio of Na₂O to SiO₂ of about 1:1.6 and containing about 24.2 per cent of Na₂O, 38.7 per cent of SiO₂ and 37.0 per cent of water. The resulting crumbly dry-mix was mixed with 3 parts of water to form a final adhesive which was found to produce considerable desizing but otherwise fairly satisfactory bonds.

In the above specific examples the ratio of the $Na_2O$ to $SiO_2$ of the silicates employed is varied from 1:1.6 to 1:3.9; the ratio of $H_2O$ to protein is varied from 3.23:1 to 0.184:1; and the percentage of water in the dry-mix is varied from 8.65 to 44.5 percent, based on the composition as a whole.

In one operation with an adhesive made up from one of our dry mixes we made a double-faced corrugated paper board using a liner and corrugated medium of wet strength kraft paper. The adhesive employed was made by mixing 30 parts of 41° Bé. silicate solution (having a ratio of $Na_2O$ to $SiO_2$ of 1:3.22 and containing 8.85 per cent of $Na_2O$) with 14.5 parts of SF#100 soya flour to form a dry-mix adhesive, aging and then mixing this with water in the proportions of 45 parts to 55 parts of water. In a second similar operation employing the same plies the adhesive used was one made by mixing 12.4 parts of SF#100 flour and 6.2 parts of colloidal clay with 30 parts of the same silicate solution to make a dry-mix adhesive, aging and then mixing this with water in the proportions of 1:1 to make the final adhesive. This second adhesive had an increased working life in comparison with the first owing to its clay content.

The above operations show that the dry-mix adhesives of this invention are well adapted to the machine fabrication of paper board. The single-facer bonds produced by both adhesives were considered good while the double-backer bond, which is the bond between the second sheet added to a double faced corrugated board, was considered at least fair. All these bonds showed good wet strength and good recovery after drying, which is rather surprising in view of the addition of so much clay in the case of the second adhesive.

It should be noted that the protein used in the final adhesives is present in sufficient quantity to cause the adhesive to increase substantially in viscosity upon the application of heat and without the evaporation of any substantial quantity of water. This is due to the glutinization of the protein. This glutinization results in what is called the "gram" which is required to adhere plies as they are passed through a fabricating machine. The protein also tends to prevent desizing, since it binds the alkali present. And it insolubilizes the adhesive bond. It should also be noted that the silicate employed in the above examples cannot be replaced with alkalis, such as alkali metal hydroxides, carbonates, phosphates, borates, etc. with the production of similar results. The wet strengths of the bonds produced by such adhesives are substantially inferior to those produced with the use of our invention.

While we have described what we consider to be the more advantageous embodiments of our invention, it is evident of course that various modifications can be made in the specific compositions and procedures described without departing from the purview of this invention. For example, it is possible to produce our dry-mix adhesives by mixing substantially anhydrous silicates with a protein flour and then hydrating this mixture until the silicate becomes quickly soluble. While we have described the mixing of a protein flour with a silicate solution and the mixing of a clay with a silicate solution followed by the addition of a protein flour, it is, of course, equally possible to mix clay with the flour and then to add the silicate. In fact this latter procedure is advantageous in the making of silicate-protein-clay adhesives, since it reduces the opportunity for the silicate to react with the flour.

It is possible to add various coloring matters to the dry mixes, such as ferric oxide or other inorganic coloring materials. Such agents are valuable additives for the reason that they serve to distinguish the adhesives from other chemicals and they produce an easily recognized glue line. As stated previously various vegetable seed flours can be used in place of the soya flour employed in the specific examples, provided that these flours contain at least about 10 to 12 per cent of protein. The carbohydrate content of these flours appears to serve as a filler and does no particular harm within the limits stated. While colloidal clay has been mentioned as a suitable material to be used to increase the viscosity of the final adhesives, other colloidal materials which impart body characteristics to the final adhesives can be used advantageously. These materials, if used in the dry-mix, must be of a type which become dispersed quickly, that is, within the time required for the silicate to dissolve. Many finely-divided inorganic solids of colloidal dimensions are operative, such as ferric oxide and graphite, and quickly-soluble organic colloidal materials, such as gelatine, pectin, cellulose esters, lignins, and the like, are suitable. Other modifications of this invention which fall within the scope of the following claims will be immediately evident to those skilled in this art.

What we claim is:

1. In the manufacture of dry-mix adhesives, the process which comprises mixing a colloidal clay with a concentrated sodium silicate solution having a ratio of $Na_2O$ to $SiO_2$ within the range of about 1:1.5 to 1:4, the clay being in amount sufficient to produce dehydration of said silicate at least to a semi-solid state, mixing in a vegetable protein in a quantity at least equal to the weight of the clay in the mixture and bringing the water content to within the range of from 5 to 47.5 per cent by weight to form a dry-mix adhesive which, when added to water, forms a final adhesive having an operating life substantially longer than that of an adhesive of similar composition formed directly from said silicate solution without passing through said semi-solid stage.

2. A dry-mix silicate-protein adhesive having a long working life when mixed with water, comprising a finely-divided, free-flowing, stable mixture of sodium silicate and an oil seed flour containing at least 10 per cent of vegetable protein in amount sufficient to produce a protein content of from about 50 to 2 per cent by weight in the adhesive, water ranging from about 5 to 47.5 per cent by weight, and from about 1 to 80 per cent by weight on the anhydrous basis of a hydrated sodium silicate having a ratio of $Na_2O$ to $SiO_2$ ranging from about 1:1.5 to 1:4; the only alkali in said dry-mix adhesive being that present in the said silicates; the components of said adhesives being so correlated that the larger percentages of silicate are employed with the smaller percentages of protein, and the larger ratios of $Na_2O$ to $SiO_2$ are employed with the larger percentages of protein and the smaller percentages of water, substantially as described; the water content being sufficient to cause said silicate to dissolve substantially completely within 30 minutes when mixed with three times its weight of water and, in the absence of the other ingredients, to coalesce.

3. The adhesive of claim 2 wherein said oil seed flour is soya bean flour.

4. The adhesive of claim 2 wherein said oil seed flour is wheat flour.

5. A dry-mix silicate protein adhesive comprising a finely-divided, free-flowing stable mixture of an oil seed flour, which contains from about 10 to 70 per cent of vegetable protein, and a hydrated sodium silicate, having a ratio of $Na_2O$ to $SiO_2$ within the range of about 1:2.4 to 1:3.9; said dry-mix adhesive containing from about 40 to 5 per cent by weight of vegetable protein, from about 10 to 60 per cent by weight on the anhydrous basis of said silicate and from about 8 to 47 per cent of water, the components of said adhesive being so correlated that the larger percentages of silicate are employed with the smaller percentages of protein, and the larger ratios of $Na_2O$ to $SiO_2$ are employed with the larger percentages of protein and the smaller percentages of water, substantially as described; the only alkali in said dry-mix adhesives being that present in said silicates; the water content being sufficient to cause said silicate in the absence of the other ingredients to coalesce and to be sufficiently soluble to dissolve substantially completely within 30 minutes when mixed with three times its weight of water; said adhesive when mixed with water being capable of forming bonds having high wet and dry strengths which exhibit substantially no alkali desizing and staining actions.

6. The adhesive of claim 5 wherein a colloidal clay is present in amount not substantially in excess of the oil seed flour.

7. In the manufacture of dry-mix adhesives, the process which comprises bringing a sodium silicate, having a ratio of $Na_2O$ to $SiO_2$ within the range of 1:1.5 to 1:4, to a state in which it is at least semi-solid but containing sufficient water to produce a water content of from about 5 to 47.5 per cent in the final mix, mixing the silicate in finely divided state with an oil seed flour which contains at least about 10 per cent vegetable protein in such proportions that the protein content of the mixture amounts to about 50 to 2 per cent by weight, and aging said silicate while in said semi-solid state for a period of at least about 4 hours to form a dry-mix adhesive; whereby said dry mix, when added to water, forms a final adhesive having a working life substantially longer than an adhesive of the same composition prepared directly from a silicate solution; the components of said adhesive being so correlated that the larger percentages of silicate are employed with the smaller percentages of protein; and the larger ratios of $Na_2O$ to $SiO_2$ are employed with the larger percentage of protein and the smaller percentages of water, substantially as described; the water content being sufficient to cause said silicate in the absence of the other ingredients to coalesce and to be sufficiently soluble to dissolve substantially completely within 30 minutes when mixed with three times its weight of water.

8. The process of claim 7 wherein said sodium silicate is brought to said semi-solid state by mixing it in the form of its aqueous solution with said oil seed flour in quantity sufficient to dehydrate said solution at least to said semi-solid state.

9. The process of claim 7 wherein the sodium silicate is brought to said semi-solid state by mixing an aqueous solution of a silicate with a solid silicate capable of extracting water from said solution, thereby producing a mixture in said semi-solid state.

10. The process of claim 7 wherein said sodium silicate is brought to said semi-solid state by mixing it in the form of its aqueous solution with a colloidal clay.

11. In the manufacture of dry-mix adhesives, the process which comprises mixing an oil seed flour, which contains at least about 10 per cent of vegetable protein, with an aqueous solution of sodium silicate, which has a ratio of $Na_2O$ to $SiO_2$ within the range of about 1:1.5 to 1:4, the quantity of flour employed being sufficient to dehydrate said silicate solution at least to the semi-solid state, to form a crumbly, free-flowing mass therewith and to produce a mixture containing from about 50 to 2 per cent by weight of vegetable protein, bringing the water content of the mixture within the range of from 5 to 47.5 per cent by weight and aging said mixture for a period of at least about 4 hours to form a dry-mix adhesive whereby said dry-mix, when added to water, forms a final adhesive which has an operating life substantially longer than that of an adhesive of the same composition produced directly from said silicate solution without passage through said semi-solid stage; said adhesive being so compounded that the larger percentages of silicate are employed with the smaller percentages of protein, and the larger ratios of $Na_2O$ to $SiO_2$ are employed with the larger percentages of protein and the smaller percentages of water, substantially as described; the water content being sufficient to cause said silicate in the absence of the other ingredients to coalesce and to be sufficiently soluble to dissolve substantially completely within 30 minutes when mixed with three times its weight of water; the only alkali added to said dry-mix adhesive being that present in said silicate.

12. In the manufacture of dry-mix adhesives, the steps which comprise bringing a liquid mass of aqueous sodium silicate to a state such that its viscosity is within the range of 10,000 to 600,000 poises at ordinary temperatures and its water content is within the range of 68 to 37 per cent, said silicate having a ratio of $Na_2O$ to $SiO_2$ within the range of about 1:4 at 10,000 poises and varying to 1:1.6 at 600,000 poises, grinding said silicate mass and mixing it with an oil seed flour containing over 10 per cent vegetable protein in quantity sufficient to produce a protein content in the adhesive ranging from about 5 to 40 per cent by weight and sufficient to form with said silicate a non-caking, free-flowing product; said adhesives being so compounded that the larger percentages of silicate are employed with the smaller percentages of protein, and the larger ratios of $Na_2O$ to $SiO_2$ are employed with the larger percentages of protein and the smaller percentages of water, substantially as described; the only alkali added being that present in said silicate.

13. The adhesives of claim 2 wherein a finely-divided, inorganic, solid, inert material of colloidal dimensions is present in said adhesives in amount not substantially exceeding the quantity of oil seed flour present.

14. The adhesives of claim 2 wherein a quickly-soluble, organic colloidal material is present in said adhesives in amount not substantially exceeding the quantity of oil seed flour present.

15. The process of claim 2 wherein said sodium silicate is brought to a semi-solid state by mixing it in the form of its aqueous solution with a finely-divided, inorganic, solid, inert material of colloidal dimensions.

16. The process of claim 2 wherein said sodium silicate is brought to a semi-solid state by mixing it in the form of its aqueous solution with a quickly-soluble organic, colloidal material.

CHESTER L. BAKER.
ROBERT H. SAMS.

REFERENCES CITED

The following references are of record in the file of this patent:

UNITED STATES PATENTS

| Number | Name | Date |
| --- | --- | --- |
| 1,391,769 | Dunham | Sept. 27, 1921 |
| 1,635,110 | Bristow | July 5, 1927 |
| 1,706,674 | Osgood | Mar. 26, 1929 |
| 1,804,640 | Osgood | May 12, 1931 |
| 1,813,377 | Banks | July 7, 1931 |
| 2,044,466 | Cleveland et al. | June 16, 1936 |
| 2,135,745 | Cone | Nov. 8, 1938 |
| 2,182,425 | Cone | Dec. 5, 1939 |

OTHER REFERENCES

"Silicates of Soda-Cements," Bulletin No. 241 by the Philadelphia Quartz Co., 1940, 9 pages.